Patented Nov. 3, 1931

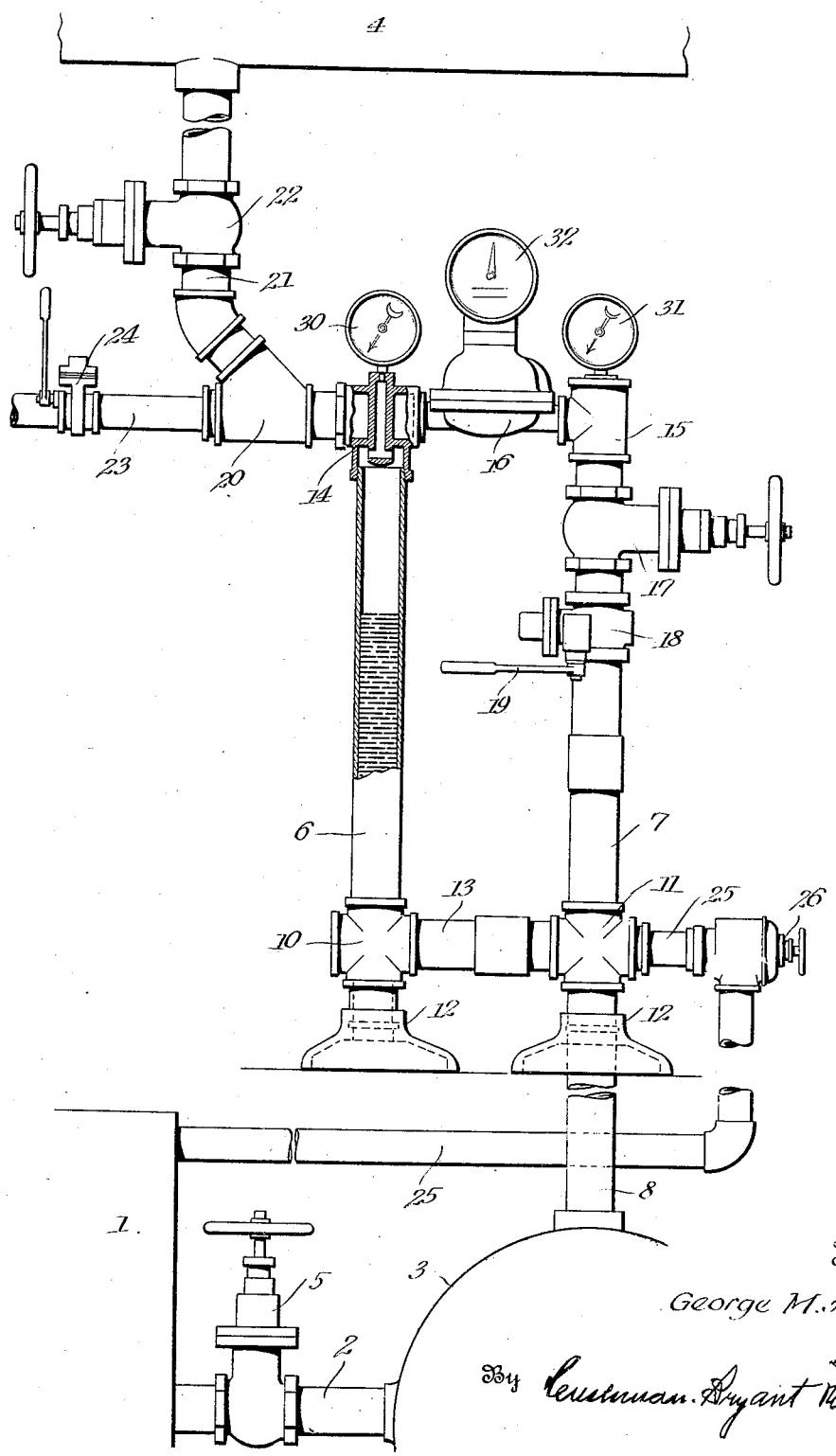

1,829,818

UNITED STATES PATENT OFFICE

GEORGE M. AGEE, OF OWENSBORO, KENTUCKY

MEANS FOR CONTROLLING FLOW OF FLUID UNDER PRESSURE

Application filed November 23, 1929. Serial No. 409,350.

The present invention relates to improvements in means for controlling flow of fluid under pressure, and while it may be employed for use with various forms of fluids, it is particularly adapted for controlling the flow of molasses to an apparatus for preparing sweetened food for live stock.

In the mixing of molasses and comminuted or pulverized grain, or other food for live stock, it is important to be able to regulate and to ascertain at any time the amount of molasses that is being supplied to the mixing apparatus, and also it is of importance to provide means for determining the amount of molasses required for forming a mixture of predetermined proportions.

By the means hereinafter described, an operator may readily determine the pressure at which the molasses is being supplied to the mixing apparatus, and also the amount or quantity of molasses which is used in producing a particular mixture.

In the accompanying drawing there is illustrated an embodiment of the invention which has been found particularly adapted for use with a stock feed mixing apparatus of the type disclosed in my prior Patent No. 1,725,240, issued August 20, 1929.

An important feature of the apparatus of the patent referred to and of the process carried out by the use of such apparatus is that the molasses is supplied to the mixing drum at normal temperatures and without being preheated.

Referring to the drawing, which is a more or less diagrammatic view of an embodiment of the invention, 1 designates a storage tank or reservoir for molasses. This reservoir is connected as by a conduit 2 with a pump 3, and the outlet of the latter communicates through means that will be hereinafter described, with the drum or casing 4 of the mixing apparatus which, as above noted, may be of the character shown in my prior Patent No. 1,725,240.

The conduit connected to the reservoir 1 and pump 3 is shown as provided with a suitable cut-off valve 5.

The flow of molasses from the pump 3 to the mixer 4 is controlled by means having the form of a stand, and including two hollow columns 6, 7, one of which is connected as by a pipe 8 with the outlet of the pump 3.

As shown, each of said columns includes a T 10, 11, each of which is mounted on a suitable base 12, and the pipe 8 leading to the pump is shown as extending through the base 12 of the column 7.

The two T's 10, 11 are connected by a pipe 13.

The pipe 8 may be connected with the foot or base 12 of either column or direct to either of the horizontal members of the T's 10, 11, according to the position in which the apparatus is to be arranged with relation to a building or other objects, and it will be understood that the openings in the base and at the left hand side of the T coupling 10, for example, will be closed by suitable detachable means.

The upper ends of the columns 6, 7 include suitable heads or caps 14, 15, which are shown as being connected by and supporting a meter housing 16.

In the column 7 are arranged two valves 17, 18, the latter being a quick closing or throttle valve having but two positions, namely, one in which the passage through the column 7 is completely opened and the other in which such passage is closed, and this valve is adapted to be operated by a laterally projecting hand lever 19.

The regulating valve 17 is adapted to be manipulated by a suitable hand wheel to reduce or vary the area of the passage through the column 7 to the head 15.

The outer end of the cap or head 14 of the column 6 connects with an angular conduit 20, one branch 21 of which leads to the mixing apparatus 4, and has a cut-off valve 22 located therein, while the other branch 23 is provided with a valve 24 and is adapted to deliver fluid to any suitable receptacle or at a point remote from the control means when desired.

As shown, the right hand end of the T 11 of the column 7 is connected by a by-pass pipe 25 with the storage tank 1, a suitable relief or by-pass valve 26 being interposed in this connection.

When the apparatus is operating, the pump 3 will deliver the fluid to both columns 6, 7, compressing air in the upper portion of the chamber of the column 6, and the pressure of this compressed air and of the fluid below the valve 18 will be indicated on a suitable gauge 30. If the valves 18 and 17 are open, the fluid will be delivered to the head 15 and meter casing 16, the amount of fluid and pressure thereof being determined by the adjustment of the valve 17. Pressures in the head 15 or above the valve 17 will be indicated on a suitable dial 31, and the dial 32 of the meter 16 will indicate, in pounds, for example, the amount of fluid which passes through the meter casing.

The air compressed in the upper portion of the column 6 acts as a cushion balance for the pump, stabilizing the flow of fluid which is indicated, as before described, by movement of the hands of the indicators 30, 31. By adjusting the relief valve 26, the pressure exerted by the pump can be regulated as desired, and when the pump is not in action, opening of this valve will permit any of the fluid in the columns 6, 7, returning to the storage reservoir 1.

When the valve 17 has been properly adjusted to supply a definite proportion of fluid to the mixer 4, which position can be determined by an inspection of the indicators 30, 31, manipulation of the "throttle" valve lever 19 will cut off the flow. To vary the proportion of fluid supplied to the mixer at any time, it is only necessary to adjust the valve 17 and having once, by observation of the indicators 30, 31, determined the proper position of such valve to obtain a mixture containing a definite proportion of liquid, the operator can always be certain of duplicating this condition by adjusting the valve 17.

If desired, the supply of fluid to the mixer 4 can be interrupted by closing the valve 22, and if it is desired to utilize the apparatus to pump fluid from the reservoir or tank 1 and deliver it into barrels, for example, or at some other point, the valve 24 can be opened. The valve 22 also prevents, when closed, the drawing of molasses and feed, for example, from the mixing apparatus 4 into the control stand and pump if the movement of the pump should be reversed or the pipes connecting it with the mixer disconnected for any reason.

By manipulating the "throttle" valve 18, the operator can accurately and readily cut off the flow of fluid to the mixer 4, if necessary, to take care of any choking of the feeder by which the dry ingredient of the stock food is supplied to the mixer. Also closing of this valve enables the pump to provide the desired amount of pressure, which will be shown by the indicators 30, 31, before the fluid is supplied to the conduit 21.

It is believe that the operation, advantages and improvements will be readily understood from the foregoing description in connection with the drawing.

I claim:—

1. A stand for controlling flow of fluid under pressure, comprising two hollow columns connected by a transversely extending conduit and one provided with means for connecting it with a pump, a regulating valve in one of said columns above the connection between the columns, a meter having its inlet connected with said column above the regulating valve, a delivery means connected with the meter outlet, means for indicating the pressure of fluid between the regulating valve and meter, means for indicating the pressure in the other said column, and a throttle valve for controlling flow of fluid to the regulating valve.

2. A stand for controlling flow of fluid under pressure, comprising two hollow columns connected by a transversely extending conduit and both provided with means whereby either can be connected to a pump, a regulating valve in one of said columns above the connection between the columns, a meter having its inlet connected with said column above the regulating valve, a delivery means connected with the meter outlet, means for indicating the pressure of fluid between the regulating valve and meter, means for indicating the pressure in the other said column, and a throttle valve for controlling flow of fluid to the regulating valve.

3. A stand for controlling flow of fluid under pressure, comprising two hollow columns connected by a transversely extending conduit and one provided with means for connecting it with a pump, a regulating valve in one of said columns above the connection between the columns, a meter supported by the columns and having its inlet connected with the one containing the regulating valve at a point above said valve, a delivery means connected with the meter outlet, means for indicating the pressure of fluid between the regulating valve and meter, means for indicating the pressure in the other said column, and a throttle valve for controlling flow of fluid to the regulating valve.

4. A stand for controlling flow of fluid under pressure, comprising two hollow columns connected by a transversely extending conduit and one provided with means for connecting it with a pump, a regulating valve in one of said columns above the connection between the columns, a meter supported by the columns and having its inlet connected with the one containing the regulating valve at a point above said valve, a delivery means connected with the meter outlet, two devices mounted on the upper ends of the columns for respectively indicating the pressures above and below the regulating valve, and a throttle valve for controlling flow of fluid to the regulating valve.

5. Means for controlling flow of fluid under pressure comprising a fluid tank or reservoir, a pump connected with the reservoir, a feed pipe connected with the pump outlet, an adjustable regulating valve in said pipe, a meter connected with the pipe between the outlet thereof and said valve, means for indicating the pressures in the feed pipe at both sides of the regulating valve, a throttle valve in the feed pipe between the regulating valve and the pump connection, and a valved by-pass connecting the feed pipe below the throttle valve with the fluid tank or reservoir.

In testimony whereof I have hereunto set my hand.

GEORGE M. AGEE.